United States Patent [19]

Blount

[11] 4,120,937
[45] Oct. 17, 1978

[54] PROCESS FOR THE PRODUCTION OF HALOSILICON ACIDS AND ORGANIC SILICON ACID COMPOUNDS AND RESINOUS PRODUCTS

[76] Inventor: David H. Blount, 5450 Lea St., San Diego, Calif. 92105

[21] Appl. No.: 845,464

[22] Filed: Oct. 25, 1977

[51] Int. Cl.² .............................................. C01B 25/01
[52] U.S. Cl. .................................... 423/325; 423/342; 423/341; 260/448.2 E; 260/448.2 R; 526/29; 260/347.8; 536/102; 528/26; 528/28; 528/29; 528/25; 528/34; 260/398; 260/413

[58] Field of Search ................ 260/448.2 E, 448.2 R, 260/46.5 E, 347.8, 233.3 R, 398, 413; 423/325, 342, 341

[56] References Cited
U.S. PATENT DOCUMENTS
4,063,391  1/1978  Blount .................... 260/448.2 R UX Primary Examiner—Paul F. Shaver

[57] ABSTRACT

Dry granular hydrated silica is mixed with silicon tetrahalides, and they react chemically to produce a mixture of halosilicon acids.

29 Claims, No Drawings

PROCESS FOR THE PRODUCTION OF HALOSILICON ACIDS AND ORGANIC SILICON ACID COMPOUNDS AND RESINOUS PRODUCTS

BACKGROUND OF THE INVENTION

This invention relates to a process for the production of novel halosilicon acids by chemically reacting a silicon tetrahalide with a dry, fine granular hydrated silica.

The hydrated silica used in this process may be produced by the chemical reaction of a dry alkali metal metasilicate with a mineral acid or an acid hydrogen containing salt. The hydrated silica compound used in the Examples was analyzed by infrared analysis, using the IR K Br disc method. The infrared analysis was very similar to the standard infrared analysis that was obtained with Mallinckrodt's hydrated silica, except for the area which shows the presence of Si—H bonds. The Si—H bonds present in the hydrated silica will reduce silver nitrate in an aqueous solution which is further evidence that Si—H bonds are present.

The molecular weight was determined from the boiling point elevation of said hydrated silica in a 6N sodium hydroxide solution and indicated a molecular weight of 78 ± 25 gm/mol. This type of reactive solution normally changes the molecular species. However, this would seem to indicate the absence of a polymeric form of silicate. This analysis may indicate a possible formula of HSi (OH)$_3$ which is orthosilicoformic acid and the presence of metasilicic acid (H$_2$SiO$_3$) while in solution. The orthosilicoformic acid, when dried, will lose water to form silicoformic acid (H.SiO.OH).

A dry, fine granular hydrate silica (SiO$_2$.x H$_2$O) produced by any of the commonly known methods may be used in this instant invention.

The silicon halide which may be employed are those which have the structural formula:

$$R_y SiX_z$$

wherein $X$ is any halogen or mixture thereof, with the preferred being chlorine; wherein $R$ is independently selected from the group consisting of a monovalent hydrocarbon radical, a monovalent alkoxy radical, and a monovalent aryloxy radical; wherein $y$ is an integer from 0–3, inclusive; wherein $z$ is an integer from 1–4, inclusive and the sum of $y$ plus $z$ is equal to 4. Each of the R radicals should preferrably, although not essentially, contain less than seven carbon atoms since the compounds containing these radicals are more readily available and have been found to be the most useful. The R radicals may be the same or different. Illustrative hydrocarbon, alkoxy, and aryloxy are as follows: alkyl radicals, such as methyl, ethyl, propyl, isopropyl, butyl, hexyl, octyl, decyl, dodecyl, ect.; alkenyl radicals, such as ethenyl, propenyl, etc.; alkynyl radicals such as ethynyl, propynyl, etc.; cycloalkyl radicals, such as cyclopropyl, cyclobutyl, cycloamyl, cyclohexyl, etc.; cycloalkenyl radicals, such as cyclobutenyl, cyclopentenyl, cyclohexenyl, etc.; aryl radicals, such as phenyl, anthracyl, naphthyl, etc.; aralkyl radicals, such as benzyl, phenyl-ethyl, phenyl-propyl, etc.; alkaryl radicals, such as xylyl, tolyl, ethylphenyl, p-butylphenyl, p-diisobutyl phenyl, etc. alkoxy radicals, such as methoxy, ethoxy, propoxy, etc.; and aryloxy radicals, such as phenoxy, p-butylphenoxy, etc. In addition, the hydrocarbon, alkoxy or aryloxy group may be substituted with non-interfering substituents, such as halo (i.e. chloro, bromo, fluor or iodo), nitro, sulfo, etc. The X substituent in the silicon halide is any halogen or mixture thereof, with the preferred being chlorine.

Exemplificative silicon halides include, but are not limited to, the following compounds; silicon tetrachloride; silicon tetrabromide; silicon tetrafluoride; silicon tetraiodide; methyltrichlorosilane; dimethyldichlorosilane; trimethylchlorosilane; diethyldichlorosilane; di-n-butyl-dichlorosilane; diphenyldichlorosilane; phenyltrichlorosilane; ethyl phenyldichlorosilane; methyl ethyldichlorosilane; methylpropyldichlorosilane; chloropolysilanes; chlorosilcarbanes; chlorosilaxanes; etc.

Silicon tetrachloride is the preferred silicon halide. The silicon tetrachloride may be utilized with any of the listed silicon halides or mixture of the listed silicon halides. This application will be limited to silicon tetrachloride as the silicon halide.

For the purpose of this invention the products produced by the chemical reaction of hydrated silica with a silicon tetrahalide will be called halosilicon acids.

The halosilicon acids may be used as any intermediate in the production of many organic silicon acid compounds. The halosilicon acids will react chemically with suitable organic compounds to produce organic silicon acid compounds, resinous products and/or foams. The resinous organic silicon acid products may be utilizing as protective coating on wood and metal, as calking compounds, as molding powders, as films and other uses. The organic silicon acid foams may be used for floatation, insulation, and as a structured strengthening material and other uses. The halosilicon acids may be used as catalysts to polymerize such compounds as methyl styrene, vinyl alkyl ethers, iosbutylene, butylene, ethylene, propylene, butadiene, allyl halides, alkene compounds, olefin compounds, terpenes, coumarone-indene compounds, furfuryl alcohol, furfural, ethylene oxide and other compounds. The halosilicon acid will also enter into and become a part of the polymer.

SUMMARY OF THE INVENTION

I have discovered that a dry, fine granular hydrated silica will react chemically with a silicon halide to produce a mixture of halosilicon acids. This basic process may be varied to produce organic halosilicon acids. The silicon tetrahalides may first be reacted chemically with suitable organo-metallic compounds containing a metal more active than silicon to produce organic silicon halides, then the organic silicon halides will chemically react with hydrated silica to produce organic halosilicon acids. The process may be varied by mixing a suitable organic compound with the hydrated silica and silicon tetrahalide to produce an organic halosilicon acid.

The exact course of the reactions which take place during the process to produce halosilicon acids is not known. When silicon tetrachloride is mixed with a dry, fine granular hydrated silica, there is a mixture of chlorosilicon acid produced in the form of a white powder. The mixture of chlorosilicon acids are believed to include trichlorosilicon silicate (Cl$_3$Si—O—SiO—OH); di (trichlorosilicon) silicate (Cl$_3$Si—O—SiO—O—SiCl$_3$) dichlorosilicon disilicate (HO—SiO—O—SiCl$_2$—O—SiO—OH) and poly (dichlorosilicon silicate) polymer

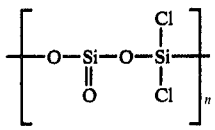

wherein $n$ is a numeral greater than 2.

In the preferred process to produce halosilicon acids, one mol of the silicon tetrahalide is mixed with 1 to 3 mols of a dry, fine granular hydrated silica, thereby producing a white granular mixture of halosilicon acids. The reaction takes place at ambient pressure and the temperature is kept below the boiling point of the silicon tetrahalide.

The reactions of this invention may take place under any suitable physical condition. While many of the reactions will take place acceptably at ambient temperature and pressure, in some cases, better results may be obtained at somewhat elevated temperatures and pressures. Preferably, the reaction takes place at a temperature between 20° C. and the boiling temperature of the silicon halide. In some cases it may be necessary to cool the reactant vessel to liquify the gaseous organic compound.

The halosilicon acids produced by the present process will react chemically with suitable organic compounds and polymers to produce organic silicon and compounds and resinous products. Suitable organic compounds include alcohols, polyols, aldehydes, organic compounds containing hydroxyl groups, organic acids, organic anhydrides, ketones, ketenes, isocyanates, vinyl monomers, organic dienes, ethylene oxide, alkynes, furan compounds, amino compounds, amine compounds, polyamines, ammonia, phenol compounds, alkali metal cyanides, polyester polymers, polyether polymers, alkyl silanetriols, dialkyl silanediols, epoxy compounds and resins, isocyanic acid, allyl halides and alcohol, ethylene, propylene, alkene compounds, olefin compounds, coumarone-idene, terpenes, polyvinyl alcohol, and mixtures thereof.

The halosilicon acids will react chemically with organometallic compounds containing a metal more active than silicon such as dimethyl zinc, diethyl zinc, sodium organic compounds, lithium organic compounds, alkyl magnesium halides and aryl magnesium halide to produce organic silicon acid compounds. The Grignard Reagents are the preferred organometallic compounds.

The primary object of the present invention is to produce halosilicon acids. It is an additional object of this invention to prepare halosilicon acids which are a white powder, are safer to handle and are less expensive than silicon tetrachloride. It is a further object of the present invention to produce halosilicon acids which will react with organic compounds to produce useful organic silicon acid compounds, resinous products and foams. It is a further object of the present invention to prepare halosilicon acids which will react chemically with organometallic compounds containing a metal more active than silicon to produce organic silicon acid compounds and resinous products. Still a further object is to produce halosilicon acids which will react chemically with Grignard Reagents to produce organic silicon acid compounds.

DESCRIPTION OF PREFERRED EMBODIMENTS

My invention will be illustrated in greater detail by the specific examples that follow, it being understood that those preferred emobidments are illustrative of, but not limited to, procedures which may be used in the production of halosilicon acids. Parts and percentages are by weight unless otherwise indicated.

EXAMPLE I

About 2 parts by weight of a dry, fine granular hydrate silica and 3 parts by weight of silicon tetrachloride are mixed at ambient temperature and pressure then agitated for 1 to 4 hours. Hydrogen chloride is given off from the mixture. In 6 to 12 hours the reaction is complete, thereby producing a mixture of halosilicon acids in the form of a fine, white powder.

EXAMPLE II

About 2 parts by weight of a dry, fine, granular hydrated silica is slowly added to 4 parts by weight of silicon tetrachloride while agitating for 1 to 4 hours, thereby producing a fine, white, granular mixture of halosilicon acids. Hydrogen chloride is given off from the mixture.

EXAMPLE III

About 2 parts by weight of a dry, fine, granular hydrated silica and 2 parts by weight of silicon tetrachloride are mixed. Hydrochloric acid is given off from the mixture. The mixture is agitated; the temperature is kept below the boiling temperature of silicon tetrachloride for 1 to 4 hours, and the chemical reaction is complete in 6 to 12 hours; a white, fine, granular mixture of halosilicon acids is produced.

EXAMPLE IV

About 3 parts by weight of silicon tetrachloride are slowly added while agitating to 2 parts by weight of hydrated silica at ambient temperature and pressure. Hydrogen chloride is given off the mixture. The reaction is complete in 6 to 12 hours, thereby producing a white colored, fine, granular mixture of halosilicon acids.

EXAMPLES UTILIZING CHLORINATED SILICON ACIDS

EXAMPLE V

About 2 parts by weight of a dry, fine granular hydrated silica and 3 parts by weight of silicon tetrachloride are mixed at ambient pressure and temperature then agitated. Hydrogen chloride is given off the mixture. The reaction is complete in 6 to 12 hours, thereby producing a white, fine, granular mixture of halosilicon acids.

About 1 part by weight of the chlorinate silicon acids and about 2 parts by weight of a methyl styrene are mixed and agitated for 1 to 8 hours at ambient pressure and temperature. The reaction is complete in 6 to 8 hours, thereby producing a clear methylstyrene silicon acid resinous product.

The methyl styrene silicon acid resinous product may be molded into useful objects such as knobs, gears, toys, etc. by heat and pressure.

EXAMPLE VI

About 1 part by weight of the mixture of halosilicon acids as produced in Example 5 and 2 parts by weight of a vinyl alkyl ether (isobutyl vinyl ether) are mixed then agitated for 1 to 4 hours at ambient pressure and temperature. The reaction is complete in 6 to 8 hours, thereby producing a soft, black, rubbery vinyl silicon acid resinous product. The resinous product is washed with an aqueous solution of sodium carbonate (10%) to remove any hydrogen chloride. The resin may be used as a calking compound.

Other vinyl alkyl ethers may be used in this example to produce a vinyl alkyl silicon acid resinous product.

EXAMPLE VII

One part by weight of the mixture of halosilicon acids as produced in Example 5 and 1 to 2 parts by weight of acrylic acid are mixed then agitated for 1 to 4 hours at ambient pressure and temperature. The chemical reaction is complete in 6 to 8 hours, thereby producing a clear acrylic silicon acid resinous product. The resin is then washed to remove any hydrogen chloride.

EXAMPLE VIII

One part by weight of halosilicon acids as produced in Example 5 and 2 to 3 parts by weight of styrene are mixed then agitated at ambient pressure and temperature for 1 to 4 hours. The chemical reaction is complete in 6 to 8 hours, thereby producing a clear solid styrene silicon acid resinous product. The resin is then washed with water to remove any hydrogen chloride. The sytrene silicon acid resinous product may be molded into useful products such as handles, knobs, glasses, toys, ect. by heat and pressure.

EXAMPLE IX

Two parts by weight of the mixture of halosilicon acids as produced in Example 5 and 2 to 3 parts by weight of acrolein are mixed and agitated for 1 to 4 hours at ambient temperature and pressure, thereby producing a solid aldehyde silicon acid resinous product (acrolein silicon acid resinous product). The resin is washed with water to remove the hydrogen chloride. The resinous product may be molded into useful products such as knobs, handles, vases, etc. by heat and pressure.

EXAMPLE X

Two parts by weight of the mixture of halosilicon acids as produced in Example 5 and 3 parts by weight of crotonaldehyde are mixed then agitated for 10 to 30 minutes at ambient temperature and pressure, and the chemical reaction is complete in 1 to 4 hours, thereby producing crotonaldehyde silicon acid resinous product. The resinous product may be ground up into a powder and used as a molding powder. It may be molded into useful objects such as buttons, knobs, handles, toys, etc. by heat and pressure.

Other aldehydes may be utilized in this Example in place of crotonaldehyde such as formaldehyde, acetoaldehyde, furfural, acrylic aldehyde, butylaldehyde, chloral, paraformaldehyde and mixtures thereof; to produce aldehyde silicon acid resinous product.

EXAMPLE XI

About 2 parts by weight of the mixture of halosilicon acids as produced in Example 2 and 2 to 6 parts by weight of furfural are mixed then agitated for 10 to 30 minutes, thereby producing a black, solid furfural silicon acid resinous product. The halosilicon acids and furfural mixture may be poured into a mold before it solidifies. It may be molded into useful products such as tool handles, art objects, etc.

EXAMPLE XII

About 2 parts by weight of the mixture of halosilicon acids as produced in Example 1 and 2 parts by weight of acetoaldehyde are mixed then agitated for 10 to 30 minutes and the chemical reaction is complete in 1 to 4 hours, thereby producing acetoaldehyde silicon acid resinous product. The resinous product may be made into a molding powder and used to produce useful products such as knobs, handles, art objects, etc.

EXAMPLE XIII

About 2 parts by weight of the mixture of halosilicon acids as produced in Example 5 and 6 parts by weight of ethyl alcohol are mixed and agitated at ambient temperature and pressure for 1 to 2 hours. The chemical reaction is complete in 1 to 4 hours, thereby producing a mixture of ethyl silicon acid compounds, part are soluble in the alcohol solution and a small part is not soluble. Sodium carbonate is added to the alcoholic solution in an amount equivalent to the chlorine present, and the ethyl silicon acid compounds are precipitated out as a white powder. The ethyl silicon acid compounds are soluble in ethylene dichloride. A solution of the ethyl silicon acid may be used as a filler in paints and varnishes. The ethyl silicon acid may be reacted chemically with a dicarboxyl anhydride to produce a useful film.

Other alcohols may be utilized in place of ethyl alcohol such as methyl, propyl, isopropyl, butyl, amyl, hexyl, heptyl, octyl, nonyl, decyl, isobutyl, lauryl and mixtures thereof, to produce alcohol silicon acid compounds.

EXAMPLE XIV

Two parts by weight of the mixture of halosilicon acids as produced in Example 5 and 6 parts by weight of methyl alcohol are mixed then agitated for 1 to 4 hours, at ambient pressure and temperature. The chemical reaction is complete in 1 to 8 hours, thereby producing mixture of methyl silicon acid compounds. The methyl silicon acid compounds may be mixed with phthalic anhydride in about equal parts by weight then heated to just above the melting temperature of phthalic anhydride while agitating for 1 to 3 hours, thereby producing a phthalic silicon acid resinous product which is soluble in organic solvents and may be used as a protective coating on wood.

EXAMPLE XV

Two parts by weight of the mixture of halosilicon acids as produced in Example 5 and 1 to 4 parts by weight of glycerol are mixed and agitated at ambient temperature and pressure for 1 to 2 hours. The chemical reaction is completed in 2 to 8 hours, thereby producing a thick, clear liquid, polyol silicon acids (glycerol silicon acid).

Water is added to the glycerol silicon acids and the glycerol silicon acids are precipitated. The water and hydrogen chloride are filtered off. The glycerol silicon acids dry as a white powder.

About equal parts by weight of the glycerol silicon acid powder and toluene diisocyanate (80% 2,4; 20%

2,6) are mixed and agitated for about 10 minutes. About 1 to 3% by weight of glacial acetic acid is added to the mixture and agitated for a few minutes. The mixture begins to expand. It expands 4 to 8 times its original volume, thereby producing a tough, semirigid foam. The foam is soluble in glacial acetic acid and may be used as a protective coating on wood. The foam may be used for flotation and insulation.

Other polyols may be used in place of glycerol such as ethylene glycol, propylene glycol, butylene glycol, trimethylene glycol, tetramethylene glycol, diethylene glycol, triethylene glycol, dipropylene glycol, tetraethylene glycol, polyethylene glycols, etherglycols, glycerol monochlorohydrin, bis(B-hydroxyethyl) terephthlate, pentaerythyritol, trimethol propane, trimethol ethane, 2,2-oxydiethanol, castor oil, glucose mannose, fructose, cane sugar, starches, and mixtures thereof, to produce polyol silicon acids.

EXAMPLE XVI

About 2 parts by weight of halosilicon acids as produced in Example 1 and 2 parts by weight of glacial acetic acid are mixed then agitated for 1 to 8 hours at ambient temperature and pressure, thereby producing white granules of organic ester silicon acids (ethyl ester silicon acid) compound.

About 2 parts by weight of the ethyl ester silicon acids and 1 part by weight of diethylenetriamine are mixed; then about 2 parts by weight of epichlorohydrin are slowly added while agitating and keeping the temperature below 70° C., thereby producing a thick liquid, epoxy silicon acid polymer. The polymer is then poured into a mold to produce useful products such as tool handles, knobs, etc. The mold is heated to 80° to 100° C., thereby producing a hard, tough, useful product.

Other monocarboxylic acid may be used in place of acetic acid in this Example such as formic, propanoic, glyolic, butanoic, pentanoic, hexanoic, heptanoic, octanoic, nonanoic, decanoic, undecylic, lauric, myristic, polmitic, stearic and mixture thereof, to produce organic ester silicon acid compounds.

EXAMPLE XVII

About 2 parts by weight of halosilicon acids as produced in Example 1 and 3 parts by weight of ethylene glycol are mixed then agitated for 1 to 2 hours at ambient temperature and pressure. The chemical reaction is complete in 2 to 8 hours, thereby producing a clear mixture of polyol silicon acids (ethylene glycol silicon acids).

About equal parts by weight of the ethylene glycol silicon acids and maleic anhydride are heated to just above the melting temperature of maleic anhydride while agitating for 1 to 2 hours, thereby producing a polyester silicon acid resinous product. This resinous product is soluble in organic solvents and may be used as a protective coating on wood. It may also be copolymerized with a vinyl monomer by mixing in a peroxide catalyst and applying it to fiberglass to make rigid panels, boats, containers, tanks, etc.

EXAMPLE XVIII

About 2 parts by weight of halosilicon acids as produced in Example 5 and about 4 parts by weight furfuryl alcohol are mixed then agitated at ambient temperature and pressure for 3 to 10 minutes, thereby producing a brown furfuryl silicon acid resinous product. The resin is washed with water to removed any hydrogen chloride. The furfuryl silicon acid resinous product, while still in the liquid stage, may be poured into a mold of useful products such as art objects, knobs, handles, etc.

EXAMPLE XIX

As an example of the catalytic properties of the halosilicon acids as produced in Example 1, about 0.05 to 2 parts by weight of halosilicon are mixed with about 3 parts by weight of methyl styrene. The methyl styrene polymerizes at ambient temperature and pressure. The mixture is agitated for about 1 hour and the reaction is completed in 6 to 12 hours, thereby producing a clear poly (methyl styrene) polymer. When 1 to 2 parts by weight of halosilicon acids are used, poly (methyl styrene silicon acids) resinous product is produced. The resinous product softens with heat and may be molded into useful products such as tubes, pipes, glasses, etc.

EXAMPLE XX

About 2 parts by weight of the halosilicon acids as produced in Example 1 and 3 parts by weight of an alkyl silanetriol, methyl silanetriol, are mixed then agitated for 1 to 4 hours at ambient temperature and pressure, thereby producing a methyl silanetrisilicate compound.

EXAMPLE XXI

About 2 parts by weight of the halosilicon acids are produced in Example 1 and 3 parts by weight of adipic acid are mixed then heated to just above the melting temperature of the adipic acid while agitating for 1 to 4 hours, thereby producing a mixture of organic ester silicon acid compound and polymers (adipic silicon acid compounds and polymer).

The said mixture is mixed with about 2 parts by weight of propylene glycol and then heated while agitating to just below the boiling temperature of propylene glycol for 1 to 2 hours, thereby producing a polyester silicon acid resinous product. The polyester silicon acid resinous product will soften with heat and can be molded into useful products such as gears, tools, toys, etc.

EXAMPLE XXII

A solution of ethyl magnesium bromide in ether was formed from 3 parts by weight of magnesium, 50 parts by weight of ethyl ether and 15 parts by weight of ethyl bromide. This solution is slowly added over a period of 10 to 30 minutes to about 25 parts by weight of halosilicon acids as produced in Example 1 while agitating at ambient temperature and pressure. The mixture is then heated to the boiling point of the mixture while agitating for about 1 hour. The mixture is washed with water, then filtered, thereby recovering white granules of organic silicon acids, ethyl silicon acids and diethylsilicon acids.

The ethyl silicon acids and diethylsilicon acids may be reacted chemically with dicarboxyl anhydrides to produce resinous products which are soluble in suitable organic solvents, will form useful films when dried and may be used as a protective coating on wood.

EXAMPLE XXIII

A Grignard Reagent, butyl magnesium bromide in ethyl ether, which is produced by reacting 5 parts by weight of magnesium with 30 parts by weight of n-butyl bromide in 85 parts by weight of ethyl ether. This Grignard Reagent is slowly added to about 40 parts by weight of halosilicon acid as produced in Example 1. The mixture is agitated at ambient pressure while keeping the temperature below the boiling point of the mixture and while adding the Grignard Reagent. The mixture is then heated to the boiling point of the mixture while agitating for about 1 hour. The mixture is then washed with water and filtered, thereby recovering granules of butyl silicon acids and dibutyl silicon acids.

Other organometallic compounds such as lithium organic compounds, sodium organic compounds, dimethyl zinc, diethyl zinc, alkyl magnesium halides, aryl magnesium halides and mixtures thereof may be used in place of the butyl magnesium bromide to produce organic silicon acids; 1 to 3 mols of the organometallic compound is used per mol of the halosilicon acids.

EXAMPLE XXIV

About 3 parts by weight of halosilicon acids as produced in Example 1, about 0.5 parts by weight of methyl iodide and about 1 part by weight of amyl bromide are mixed and then added over a period of 10 to 30 minutes to metallic magnesium in ethyl ether, in the proportion of one mol of magnesium per mol of halide present in the mixture. The solution is then heated to the boiling point of the mixture while agitating for about 1 hour. The mixture is then washed with water and filtered, thereby recovering granules of organic silicon acids, (methyl amyl silicon acids and dimethyl amyl silicon acid).

The methyl amyl silicon acids will react chemically with benzoxyl chloride to produce a resinous product which will form a solution in a suitable solvent and may be used as a protective coating on wood, metal, etc.

Other organic halide compounds such as alkyl halides, aryl halides or mixtures thereof may be used in place of the methyl iodine and amyl bromide. They may be used in the amount of 1 to 3 mols of the organic halide to each mol of the halosilicon acids and one mol of metallic magnesium to each mol of halide present in the organic halide and halosilicon acids.

EXAMPLE XXV

Two parts by weight of halosilicon acids as produced in Example 2 and 1 to 4 parts by weight of epichlorohydrin are slowly mixed then agitated at ambient pressure while keeping the temperature below the boiling point of epichlorohydrin for 10 to 30 minutes, thereby producing an epoxy silicon acid resinous product.

Other suitable epoxy compounds may be utilized as in the above Example such as glycidol; methyl epichlorohydrin; 1,2-epoxy butane; 1,2 epoxycyclohexane; epoxyethane; 1,2 3:4 diepoxybutane; epoxyethylbenzene; 2:3 epoxypropane; 1:2, 3:4 diepoxybutane; epoxyethylbenzene; 2:3, 6:7 diepoxy-2,6-dimethyl-4-octene; epoxidized polyhydroxy compounds; epoxidized vegetable oils; epoxidized unsaturated fatty acids; epoxidized diolefin or polyolefin compounds and mixtures thereof.

EXAMPLE XXVI

Two parts by weight of halosilicon acids as produced in Example 1 and 2 to 3 parts by weight of Bisphenol A epoxy resin containing 2 or more active epoxy radicals per molecule are mixed, the reaction is complete in 1 to 4 hours, thereby producing an epoxy silicon acid resinous product.

The epoxy silicon acid resinous product may be poured into a mold while still in the liquid state, then will harden into a tough, useful product such as gears, knobs, handles, etc.

EXAMPLE XXVII

About 1 part by weight of halosilicon acids as produced in Example 3 and 1 to 2 parts by weight of phenol are mixed then agitated at ambient temperature and pressure for 1 to 6 hours, thereby producing phenol silicon acids.

The phenol silicon acids are then mixed with an aldehyde, an aqueous solution containing 37% formaldehyde, in the amount of 1 to 2 mols for each mol of phenol used. The mixture is then heated to 70° to 100° C. while agitating for 0.5 to 3 hours thereby producing a phenoplast silicon acid resinous product.

The phenoplast silicon acid resinous product may be poured into a mold of useful product such as gears, pulleys, etc., where in the liquid stage and heating continued until a tough solid product is formed.

Other phenols may be used in place of phenol such as cresols, xylenols, creosote, resourcinol, Bisphenol A [2,2-bis(4-hydroxy phenyl) propane] and mixtures thereof, thereby producing phenol silicon acid compounds.

EXAMPLE XXVIII

One part by weight of halosilicon acids as produced in Example 1 and 1 to 2 parts by weight of urea are mixed then heated to just above the melting point of urea while agitating at ambient pressure for 30 to 60 minutes, thereby producing aminosilicon acid compounds.

The aminosilicon acid compounds are then mixed with an aqueous solution of 37% formaldehyde in the ratio of 1 mol of the amino compound to 1 to 5 mols of the formaldehyde then heated to 70° to 100° C. while agitating at ambient pressure for 30 to 60 minutes, thereby producing an aminoplast silicon acid resinous product.

The aminoplast silicon acid resinous product may be molded into useful products such as art objects, knobs, ect. by heat and pressure.

Other amino compounds may be used in place of urea such as thiourea, dicyandiamine, melamine, anilene, quanidine, diamines, alkyl-substituted ureas and mixtures thereof.

EXAMPLE XXIV

One part by weight of halosilicon acids as produced in Example 1 and 1 to 4 parts by weight of allyl chloride are mixed, then agitated at ambient temperature and pressure for 1 to 12 hours, thereby producing poly (allyl chloride silicon acid) resinous product.

Other allyl halides may be utilized in this Example such as allyl bromide and methyl allyl chloride.

The poly (allyl chloride silicon acid) resinous product may be used as a coating agent, adhesive agent, in molding powders, etc.

EXAMPLE XXX 0.05 to 1 part by weight of halosilicon acids as produced in Example 1 and 1 to 3 parts by weight of N-vinyl-2-pyrrolidone are mixed then agitated at ambient temperature and pressure for 1 to 2 hours thereby producing a poly (N-vinyl-2-pyrrolidone silicon acid) resinous product.

This resinous product may be molded into useful product as handles, knobs, etc. by heat and pressure.

Other vinyl monomers may be used in place of N-vinyl-2-pyrrolidone such as acrylic acid, methacrylic acid, ethyl acrylic acid, methyl methacrylic acid, methyl styrene, styrene, vinyl acetate, methyl alkenes, vinyl alkyl ethers, monovinyl ethers, divinyl ethers, allyl vinyl ethers, alicylic ethers, aryl alkyl vinyl ethers, aryl vinyl ethers, vinylidene chloride, vinyl chloride, vinyl toluenes and mixtures thereof. The temperature should be kept below the boiling temperature of the vinyl monomer.

EXAMPLE XXXI

About 0.2 to 2 parts by weight of the halosilicon acids as produced in Example 1 and 1 to 3 parts by weight of styrene are mixed the agitated at ambient temperature and pressure for 1 to 8 hours, thereby producing a poly (styrene silicon acid) resinous product.

Other styrene compounds such as methyl styrene may be used instead of styrene.

Styrene silicon acid resinous products may be molded into useful objection such as toys, containers, etc., by heat and pressure.

EXAMPLE XXXII

About 2 parts by weight of the halosilicon acids as produced in Example 2 and 2 to 4 parts by weight of maleic acid are mixed then heated to just above the melting temperature of the maleic acid while agitating for 1 to 4 hours, thereby producing a mixture of maleic ester silicon acid compounds and resinous products.

This mixture may be used to produce rigid isocyanate silicate foam by reacting about equal parts by weight of a polyisocyanate; toluene diisocyanate, with the organic ester silicon acid compound and resinous product then agitating for about 10 to 20 minutes, then adding water in the amount of 1% to 3% by weight. The mixture is then agitated for a few minutes until the mixture begins to expand, thereby producing a rigid isocyanate silicate rigid foam. The foam may be used for floatation and insulation.

Other polycarboxylic acid may be used in this example in place of maleic acid such as phthalic, succinic, oxalic, malonic, glutaric, adipic, pimelic, suberic, isophthalic, fumaric, azelaic, sebacic, terephthalic, itaconic, malic, tartaric and mixtures thereof to produce organic ester silicon acid compounds and resinous products.

EXAMPLE XXXIII

About 2 parts by weight of halosilicon acids and 2 to 4 parts by weight of a polycarboxylic anhydride, phthalic anhydride, are mixed the heated to just above the melting temperature of phthalic anhydride while agitating at ambient pressure for 1 to 4 hours, thereby producing a carboxylic acid silicon acid anhydride compound and resinous product (phthalic acid silicon acid anhydride compound and resinous product).

The above mixture may be heated with about equal parts of a polyol, diethylene glycol, while agitating at a temperature just below the boiling temperature of diethylene glycol and at ambient pressure for 1 to 4 hours, thereby producing a polyester silicate resinous product. The polyester silicate resinous product is soluble in suitable organic solvents and may be used as a protective coating on wood.

Other polycarboxylic anhydrides may be used in this Example in place of phthalic anhydride such as succinic, glutaric, tetrachlorophthalic, dl-camphoric, diglycolic, pyromellitic, tetrahydrophthalic, dodecenylsuccinic, hexadecylsuccinic, nitrophthalic, poly (adipic anhydride); 1,2 cyclohexanedicarboxylic; ende-cis-5-nor-bornene-2-3-dicarbolic; cis-4-cyclohexene-1,2, dicarboxylics, and mixtures thereof.

EXAMPLE XXXIV

Halosilicon acids may be utilized as a catalyst or react chemically with organic diene. Halosilicon acids may be used in the amount of 0.05 to 1 parts by weight to 1 to 3 parts by weight of diene.

About 0.05 to 1 part by weight of halosilicon acids as produced in Example 1 are slowly added to a container containing isobutylene, 1 to 3 parts by weight, in methyl chloride which has been packed in powdered dry ice and cooled to 90° to 100° F. to liquify the isobutylene. The mixture is agitated for 20 to 30 minutes while adding the halosilicon acid; the chemical reaction is complete in 1 to 8 hours, thereby producing poly (isobutylene silicon acid) resinous product. The poly (isobutylene silicon acid) polymer is then washed with water and the methyl chloride is filtered off.

Other dienes in their liquid state may be used in place of isobutylene such as butadiene, butylene, isoprene, chloroprene and mixtures thereof, thereby producing poly (organic diene silicon acid) resinous product.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of halosilicon acids by the following steps:
   (a) mixing about 1 part by weight of a dry, fine, granular hydrated silica with about 1 to 2 parts by weight of a silicon tetrahalide, silicon tetrachloride;
   (b) agitating the mixture at ambient temperature and pressure for 1 to 4 hours, and the chemical reaction is complete in 6 to 12 hours, thereby
   (c) producing a white, fine, granular mixture of halosilicon acids.

2. The method according to claim 1 wherein an additional step is added following step (d) wherein an alcohol selected from the group consisting of methol, ethanol, propanol, isopropyl alcohol, butanol, pentanol, hexanol, allyl alcohol, furfuryl alcohol and mixtures thereof, is mixed with 2 parts by weight of halosilicon acids an about 1 to 2 parts by weight of the alcohol, then agitated at ambient temperatures and pressure for 1 to 2 hours; the chemical reaction is complete in 1 to 4 hours thereby producing alcohol silicon acid compounds.

3. The method of claim 1 wherein an additional step is taken following step (d) wherein a polyol selected from the group consisting of glycerol, ethylene glycol, propylene glycol, butylene glycol, trimethylene glycol, tetramethylene glycol, pentamethylene glycol, hexamethylene glycol, diethylene glycol, triethylene glycol, dipropylene glycol, tetraethylene glycol, polyethylene glycols, ether glycols, glycerol monochlorohydrin, bis (B-hydroxyethyl) terephthalate, pentaerythritol, trimethol propane, trimethol ethane; 2,2-oxydiethanolcastor oil, starch and mixtures thereof, in the amount of 1 to 4 parts by weight per 2 parts by weight of halosilicon acids are mixed with the halosilicon acids then agitated at ambient temperature and pressure for 1 to 2 hours; the reaction is completed in 2 to 8 hours, thereby producing polyol silicon acids.

4. The method of claim 1 wherein an additional step is taken following step (d) wherein an aldehyde selected from the group consisting of formaldehyde acetoaldehyde, furfural, crotonaldehyde, acrolein, acrylic aldehyde, butylaldehyde, chloral, paraformaldehyde, and mixtures thereof, in the amount of 1 to 3 parts by weight, are mixed with 1 part by weight of halosilicon acids then agitated for 10 to 30 minutes at ambient temperature and pressure; the chemical reaction is complete in 1 to 4 hours thereby producing aldehyde silicon acid resinous product.

5. The method of claim 1 wherein an additional step is taken following step (d) wherein a monocarboxylic acid, selected from the group consisting of formic, acetic, propanoic acid, glycolic acid, butanoic acid, pentanoic acid, hexanoic acid, heptanoic acid, octanoic acid, nanonoic acid, decanoic acid, undecylic acid, lauric acid, myristic acid, palmetic acid, stearic acid, and mixtures thereof, in the amount of 1 to 2 parts by weight are mixed with about 2 parts by weight of halosilicon acids, then agitated at ambient temperature and pressure for 1 to 8 hours thereby producing an organic ester silicon acid compounds.

6. The method of claim 1 wherein an additional step is taken following step (d) wherein a polycarboxylic acid, selected from the group consisting of phthalic acid, maleic acid, succinic acid, oxalic acid, malonic acid, glutaric acid, adipic acid, pimelic acid, suberic acid, isophthalic acid fumaric acid, azelaic acid, sebacic acid, terephthalic acid, itaconic acid, malic acid, tartaric acid and mixtures thereof, in the amount of 2 to 4 parts by weight are mixed with about 2 parts by weight of the halosilicon acids then heated to just above the melting temperature of the polycarboxylic acid while agitating at ambient pressure for 1 to 4 hours thereby producing a mixture of organic ester silicon acid compounds and polymers.

7. The method of claim 1 wherein an additional step is taken following step (d) wherein a dicarboxylic anhydride, selected from the group consisting of phthalic anhydride, maleic anhydride, succinic anhydride, glutaric anhydride, poly (adipic anhydride), tetrachlorophthalic anhydride, dl-camphoric anhydride, 1,2-cyclohexanedicarbolic anhydride, diglycolic anhydride, tetrahydrophthalic anhydride, dodecenylsuccinic anhydride, hexadecylsuccinic anhydride, nitrophthalic anhydride; ende-cis-5-norbornene-2,3-dicarbolic anhydride; cis-4-cyclohexene-1,2, dicarbolic anhydride; pyromellitic dianhydride and mixtures thereof, in the amount of 2 to 4 parts by weight are mixed with 2 parts by weight of the halosilicon acids then heated to just above the melting temperature of the dicarboxylic anhydride while agitating at ambient pressure for 1 to 4 hours, thereby producing an organic ester silicon acid compound and polymer.

8. The method of claim 1 wherein an additional step is taken following step (d) wherein an epoxy compound, selected from the group consisting of epichlorohydrin, glycidol, methyl epichlorohydrin; 1,2-epoxybutane; 1,2-epoxycyclohexane; epoxyethane, 1,2-epoxypropane, 1-chloro-2-3-epoxypropane, 1:2, 3:4 diepoxybutane; epoxyethylbenzene; 2:3,6:7-diepoxy-2,6-dimethyl-4-octene; epoxidized polyhydroxy compounds, epoxidized vegetable oils, epoxidized unsaturated fatty acids, epoxidized diolefin or polyolefin compounds and mixtures thereof, in the amount of 1 to 4 parts by weight are slowly mixed with 2 parts by weight of the halosilicon acids, then agitated at ambient pressure while keeping the temperature below the boiling temperature of the epoxy compound for 10 to 30 minutes, thereby producing an epoxy silicon acid resinous product.

9. The method of claim 1 wherein an additional step is taken following step (d) wherein an organometallic compound, selected from the group consisting of lithium organic compounds, sodium organic compounds, dimethyl zinc, alkyl magnesium halide, aryl magnesium halide, and mixtures thereof, are slowly mixed in the amount of 1 to 3 mols per mol of the halosilicon acids in ether, agitated at ambient temperature and pressure, then heated to the boiling point of the mixture while agitating for about 1 hour; the mixture is then washed with water, filtered, thereby recovering organic silicon acids.

10. The method of claim 1 wherein an additional step is taken following step (d) wherein 1 to 3 mols of an organic halide, selected from the group consisting of an alkyl halide, aryl halide and mixtures thereof and 1 mol of the halosilicon acids are mixed then slowly added to ethyl ether, containing one mol of metallic magnesium for each mol of the halide present in the said mixture; the mixture is agitated at ambient temperature until the mixing is complete, then the mixture is heated to the boiling point of the mixture while agitating for about 1 hour; the mixture is then washed with water and filtered, thereby recovering granules of organic silicon acid compounds.

11. The method of claim 1 wherein an additional step is taken following step (d) wherein the halosilicon acids are utilized as a catalyst by mixing 0.05 to 1 part by weight with 1 to 3 parts by weight of a vinyl monomer, selected from the group consisting of acrylic acid, methacrylic acid, ethyl acrylic acid, methyl metacrylic acid, methyl styrene, styrene, n-vinyl-2-pyrrolidone, vinyl acetate, methyl alkenes, vinyl alkyl ethers, allyl vinyl ethers, alicyclic ethers, aryl alkyl vinyl ethers, aryl vinyl ethers, vinylidene chloride, vinyl chloride, vinyl toluenes, divinyl benzenes, and mixtures thereof, at a temperature below the boiling temperature of the vinyl monomer while agitating for 1 to 8 hours, thereby producing a poly (vinyl monomer silicon acid) resinous product.

12. The method of claim 1 wherein an additional step is taken following step (d) wherein the halosilicon acids are utilized as a catalyst by slowly mixing 0.05 to 1 part by weight with an organic diene, selected from the groups consisting of butadiene, isobutylene, butylene, isoprene, chloroprene and mixtures thereof, while agitating for 20 to 30 minutes at ambient pressure and at a temperature at which the organic diene is in a liquid state; the chemical reaction is complete in 1 to 12 hours thereby producing a poly (organic diene silicon acid) resinous product.

13. The method of claim 1 wherein an additional step is taken following step (d) wherein an allyl halide in the amount of 1 to 4 parts by weight per 1 part by weight of halosilicon acids and selected from the group of allyl halide, consisting of allyl chloride, allyl bromide and methyl allyl chloride, are mixed, then agitated at ambient temperature for 1 to 12 hours thereby producing a poly (allyl halide silicon acid) resinous product.

14. The method of claim 1 wherein an additional step is taken following step (d) wherein 1 to 2 parts by weight of a phenol, selected from the group consisting of phenol cresols, xylenols, creosote, resorcinol, 2,2-bis(4-hydroxy phenyl) propane and mixtures thereof, are mixed with 1 part by weight of halosilicon acids then agitated at ambient temperature and pressure for 1 to 6 hours thereby producing a phenol silicon acid compounds.

15. The method of claim 1 wherein an additional step is taken following step (d) wherein an amino compound, selected from the group consisting of urea, thiourea, dicyandiamine, aniline, diamines, guanidine, and alkyl-substituted ureas, melamine and mixtures thereof, in the amount of 1 to 2 parts by weight are mixed with about 1 part by weight of the halosilicon acids then heated to just above the melting temperature and just below the boiling temperature of the amino compound for 30 to 60 minutes while agitating at ambient pressure, thereby producing aminosilicon acid compounds.

16. The products, halosilicon acids, as produced by the method of claim 1.

17. The products, alcohol silicon acid compounds, as produced by the method of claim 2.

18. The products, polyol silicon acids, as produced by the process of claim 4.

19. The products, organic ester silicon acid compounds, as produced by the process of claim 5.

20. The product, organic ester silicon acid compounds and polymers, as produced by the process of claim 6.

21. The products, organic ester silicon acid compound and polymer, as produced by the process of claim 7.

22. The products, epoxy silicon acid resinous products, as produced by the process of claim 8.

23. The products, organic silicon acids, as produced by the method of claim 9.

24. The products, organic silicon acid compounds, as produced by the process of claim 10.

25. The product, poly(vinyl monomer silicon acid) resinous product as produced by the process of claim 11.

26. The product, poly(organic diene silicon acid) resinous product, as produced by the process of claim 12.

27. The product, poly(allyl halide silicon acid) resinous product, as produced by the process of claim 13.

28. The products, phenol silicon acid compounds, as produced by the process of claim 14.

29. The products, aminosilicon acid compounds, as produced by the process of claim 15.

* * * * *